United States Patent
Kurian et al.

(10) Patent No.: US 10,379,592 B2
(45) Date of Patent: Aug. 13, 2019

(54) POWER MANAGEMENT OF AN NZE IOT DEVICE

(71) Applicant: INTEL CORPORATION, Santa Clara, CA (US)

(72) Inventors: Dileep Kurian, Bangalore (IN); Tanay Karnik, Portland, OR (US); David Arditti Ilitzky, Guadalajara (MX); Ankit Gupta, Bangalore (IN); Sriram Kabisthalam Muthukumar, Coimbatore (IN); Vaibhav Vaidya, Portland, OR (US); Suhwan Kim, Hillsboro, OR (US); Christopher Schaef, Lebanon, NH (US); Ilya Klochkov, St. Petersburg (RU)

(73) Assignee: INTEL CORPORATION, Santa Clara, CA (US)

( * ) Notice: Subject to any disclaimer, the term of this patent is extended or adjusted under 35 U.S.C. 154(b) by 210 days.

(21) Appl. No.: 15/462,257

(22) Filed: Mar. 17, 2017

(65) Prior Publication Data

US 2018/0267591 A1 Sep. 20, 2018

(51) Int. Cl.
| | |
|---|---|
| G06F 9/00 | (2006.01) |
| G06F 1/3212 | (2019.01) |
| G06F 1/3287 | (2019.01) |
| G06F 1/329 | (2019.01) |

(52) U.S. Cl.
CPC ............ *G06F 1/3212* (2013.01); *G06F 1/329* (2013.01); *G06F 1/3287* (2013.01); *Y02D 70/00* (2018.01); *Y02D 70/26* (2018.01)

(58) Field of Classification Search
CPC .... G06F 1/3228; G06F 1/3212; G06F 1/3246; Y02D 70/26; Y02D 70/00
USPC ............ 713/300, 320, 2; 320/107; 370/311; 323/282; 340/693.3
See application file for complete search history.

(56) References Cited

U.S. PATENT DOCUMENTS

| | | |
|---|---|---|
| 2003/0041228 A1 | 2/2003 | Rosenbluth et al. |
| 2009/0307511 A1 | 12/2009 | Fiennes et al. |
| 2011/0276812 A1* | 11/2011 | Lee ............................ G06F 1/26 713/300 |
| 2012/0072743 A1* | 3/2012 | Lee ........................ G06F 1/3287 713/300 |
| 2012/0210150 A1* | 8/2012 | de Lind van Wijngaarden .......... G06F 1/3212 713/320 |

(Continued)

OTHER PUBLICATIONS

PCT/US2018/012224, International of Search Report and Written Opinion, dated Apr. 30, 2018, 12 pages.

*Primary Examiner* — Aurel Prifti
(74) *Attorney, Agent, or Firm* — Stoel Rives LLP

(57) ABSTRACT

The present disclosure provides for the management of power of a NZE IoT device. Managing power can include receiving the one or more asynchronous events from the asynchronous event system, determining if any of the one or more asynchronous events meet a respective charge qualification, generating the power-on command for the power-managed compute system if any of the one or more asynchronous events meet the respective charge qualification, and waiting for a power source to reach a threshold associated with the respective charge qualification if any of the one or more asynchronous events do not meet the respective charge qualification.

20 Claims, 8 Drawing Sheets

(56) References Cited

U.S. PATENT DOCUMENTS

| | | | |
|---|---|---|---|
| 2012/0242311 A1* | 9/2012 | Terry | H02J 7/0052 323/282 |
| 2014/0035514 A1* | 2/2014 | Wang | H02J 7/0047 320/107 |
| 2014/0380030 A1* | 12/2014 | Jain | G06F 9/4401 713/2 |
| 2015/0042484 A1* | 2/2015 | Bansal | G06F 1/3212 340/693.3 |
| 2015/0131461 A1* | 5/2015 | Ramkumar | H04W 52/0251 370/311 |
| 2016/0091939 A1* | 3/2016 | Severson | G06F 1/26 713/300 |
| 2016/0110299 A1 | 4/2016 | Sheafor et al. | |
| 2017/0013562 A1* | 1/2017 | Lim | H04M 1/725 |
| 2017/0026907 A1* | 1/2017 | Min | H04W 52/0229 |
| 2017/0060224 A1* | 3/2017 | Cao | G06F 1/3275 |

\* cited by examiner

POWER MANAGEMENT OF AN NZE IOT DEVICE

TECHNICAL FIELD

The present disclosure relates to power management of a net-zero energy (NZE) internet of things (IoT) device. In particular, the present disclosure relates to an always on power management unit (PMU) for an NZE IoT device.

DETAILED DESCRIPTION OF PREFERRED EMBODIMENTS

Figure 1:
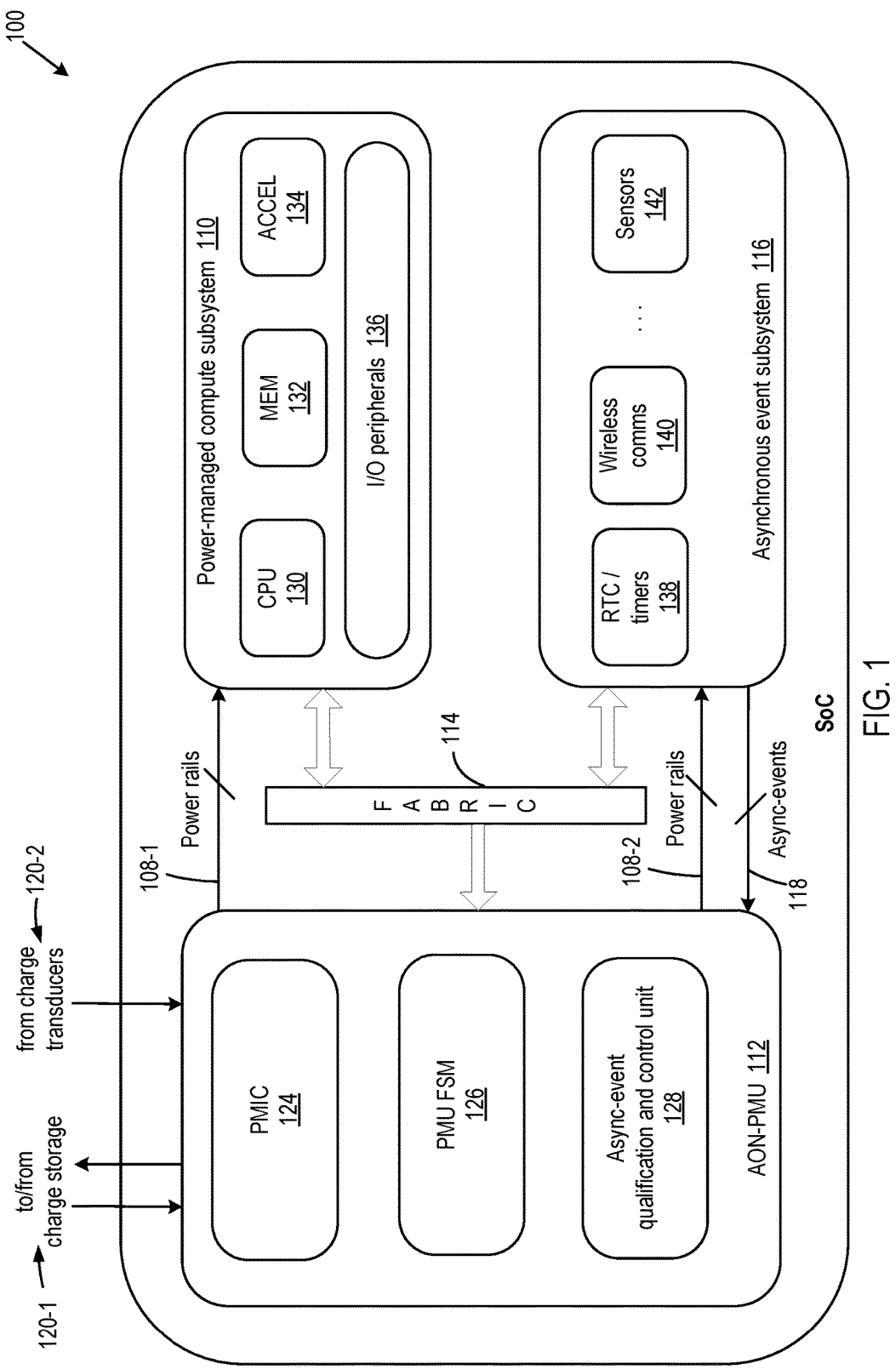
FIG. 1 is a block diagram illustrating a system of a chip (SoC) device having a PMU according to various embodiments.

The class of net-zero energy (NZE) internet of things (IoT) devices are expected to be ubiquitously used as disposable and long-lasting building blocks for ad hoc wireless sensor and actuator networks.

The NZE IoT device networks are expected to fulfill a large variety of tasks. These tasks can range from multisensor and/or actuator management to limited image and/or audio processing (e.g., feature extraction, classification, etc.) while communicating with the network and/or computing devices. Communications can include receiving instructions and reporting findings.

NZE IoT devices present physical challenges in the area of power management due to their size (e.g., small/tiny), their cost (e.g., inexpensive), and their potentially complex computations. The NZE IoT devices may be powered by very small capacity (e.g., ~10 mWHr) charge storage components (e.g., batteries, supercaps, etc.). The NZE IoT devices can harvest energy via small-capacity transduction devices capable of harvesting only microwatts to milliwatts of power.

The NZE IoT devices may utilize low duty-cycle operation. Low duty-cycle operations can include computations (e.g., sensing, actuation, and/or processing) and communication during a brief period of time, afterwards entering a deep sleep state (e.g., low power consumption state) and relying on energy harvesting to refill the consumed charge. The harvesting periods can be larger than the operation periods due to the available ambient energy and battery recharging capacity. During deep sleep periods, wake-events, either external or internal, may occur which can potentially wake up the device for it to perform a predefined task according to an associated application's requirements.

While a device is in a sleep state, different potential wake events may be valid (e.g., per an associated application) and the tasks registered to each wake event may have distinct charge requirements. While a device is in a sleep state, upon the triggering of a wake event, waking the system may be meaningless if there is not enough charge stored to service the registered task, thus the wake up would only waste energy. While a device is in an active state, upon triggering an event (e.g., an event mapped to an interrupt request (IRQ)), interrupting the execution of a current task to begin the execution of a new task is meaningless if there is not enough charge stored to at least service the new task and if possible also complete the current task.

As used herein, the NZE IoT devices can also be system on a chip (SoC) devices. Power management in SoC devices can be performed through firmware running on a small microcontroller to offer flexibility. This approach can be infeasible for NZE IoT devices, which due to the above mentioned challenges may not be maintained in an active state and may require long periods of deep sleep to enable harvesters to replenish the lost charge. As used herein, an active state can be a state in which a compute or data movement element (e.g., central processing unit (CPU), programmable accelerator, configurable accelerator, fixed function unit, direct memory access (DMA)) is booted, operating, and/or ready to operate.

Some embodiments can provide for a charge state based reconfigurable power management strategy. The charge state based reconfigurable power management strategy can be implemented for NZE IoT devices. As used herein, an NZE IoT device can also be referred to as an NZE device. In some embodiments, an always on (AON) reconfigurable and light-weight hardware (HW) power management unit (PMU) is provided. The AON PMU can also be referenced as a PMU. The PMU can control the various system power states based on a current charge state and the configuration received from a non-AON CPU. While a non-AON CPU is described herein, the configuration and control may be received from different elements of the compute subsystem (e.g., a DMA could transfer the configuration).

In active states with a CPU powered on, the power management control can be provided through firmware. In sleep states, while harvesting energy, the compute elements and/or data movement elements of the compute subsystem (e.g., CPU and/or accelerators) can be powered off while shared memory may optionally remain powered on and the AON PMU can control the various different power domains, power state transitions, and waking up of the compute systems, based on energy aware qualifications set by the CPU prior to entering the sleep state. In some examples, memory may or may not be a compute element. The memory may be a storage element. The memory may optionally be the only element powered on during a sleep state. For example, a portion or subset of the memory may remain powered during a sleep state.

The PMU can implement voltage based battery monitoring to reduce power consumption during sleep and/or harvesting states to the minimum. Monitoring can be biased by a system load. That is, voltage based monitoring is a type of monitoring that can be biased. Battery measurement based energy qualification of asynchronous events can be performed during sleep states and/or during active states. During sleep states, simultaneous and/or independent energy qualifications, for multiple asynchronous events used as wake sources (WSs), can be performed. During active states, simultaneous and/or independent energy qualifications, for multiple asynchronous events used as IRQs, can be performed.

The PMU can implement system load and/or power state dependent configuration of asynchronous event qualification. System load and/or power state dependent configuration of asynchronous event qualification can allow software to configure once and correctly operate in all power states. System load and/or power state dependent configuration of asynchronous event qualification can make a system (e.g., NZE IoT device and/or SoC device) robust to HW-driven power state transitions to sleep state due to a low charge condition or preconfigured external events causing a transition from sleep state to deeper sleep state. The system can be robust due to qualifying energy threshold configurations which can be dependent on a power state of the system. The system can be robust due to WS and/or IRQ masking configurations which can depend on the power state of the system. The system can also be robust due to automatic configuration switching during power state transitions in a safe manner taking into account transient effects in load variation to the power supply.

FIG. 1 is a block diagram illustrating an SoC 100 having a PMU according to various embodiments. As used herein, an SoC device can also be referenced as an SoC 100. The SoC 100 can include a power-managed compute subsystem 110, an AON PMU 112, and an asynchronous event subsystem 116. The power-managed compute system 110 can be described as a subsystem of the SoC 100 and as such can be referenced as a power-managed compute subsystem (CSS 110). The asynchronous event system 116 can also be described as a subsystem of the SoC 100 and as such can be referenced as an asynchronous event subsystem (AESS) 116. The asynchronous event subsystem 116 can also be power managed and as such can also be referenced as a power-managed asynchronous event subsystem.

The CSS 110 can include a CPU 130, a memory 132, an accelerator 134, and input/output (I/O) peripherals 136. Although a single CPU 130 and a single accelerator 134 are shown, the CSS 110 can include multiple CPUs and/or accelerators. At least one of the CPUs can be referred to as a host CPU. The CSS 110 can also host other components such as one or more DMAs. The AESS 116 can include a real-time clock (RTC) and/or timers 138 (e.g., system timers), a wireless communication interface 140, and sensors 142, among other components that can generate asynchronous events via, for example, general purpose input/output (GPIO) pins. The PMU 112 can include a power management integrated circuit (PMIC) 124, a PMU finite state machine (FSM) 126, and an asynchronous event qualification and control unit (128). As used herein, the PMIC 124 can describe analog circuitry used for harvesting, supplying, regulating, and state of charge monitoring, among other possible features of the PMIC 124. The asynchronous event qualification and control unit 128 can be further divided into an asynchronous event qualification unit and an asynchronous event control unit.

The PMU 112 can be coupled to the AESS 116 via an asynchronous event line 118, a power rails line 108-2, and a fabric 114. Although not shown, each of the asynchronous event line 118, the power rails line 108-1, and/or the power rails line 108-2 can comprise one or more lines. The fabric 114 can be a main interconnected fabric of the SoC. The PMU 112 can be coupled to the CSS 110 via the power rails line 108-1 and the fabric 114. The PMU 112 can also be coupled to a charge storage device 120-1 and a charge transducer 120-2. The charge storage device 120-1 and the charge transducer 120-2 can represent one or more charge storage devices 120-1 and one or more charge transducers 120-2, respectively.

The SoC 100 can also be a tiny NZE IoT edge node SoC. As previously described the SoC 100 can include the CSS 110, the AESS 116, and the PMU 112. The CSS 110 encapsulates all computing elements including the CPU 130 (e.g., host CPU). The CSS 110 can be covered and/or composed of a plurality of power domains. Each one of the plurality of power domains can be independently controlled.

The CSS 110 can be in any of a plurality of power states corresponding to a configuration for the power domains. As used herein, a power domain is a subset of the elements of a subsystem which have a common switch to be powered on or off (e.g., lockstep powered on or off). The elements of the CSS 110 can include the CPU 130, the accelerator 134, DMAs, and/or the I/O peripherals 136. A power state can summarize the state of a device or component in terms of power domain configurations. The system power states are the states of the PMU FSM 126 (e.g., a finite set of states and/or rules governing the valid transitions among the power states). The power states can define the configuration for one or more of the power domains of the SoC 100.

For example, a sleep power state can be used to configure the CSS 110 such that the power domains of the CSS 110 except optionally the memory 132 are powered off. A sleep power state can be used to configure the AESS 116 such that one or more of the power domains are powered off.

Figure 3:
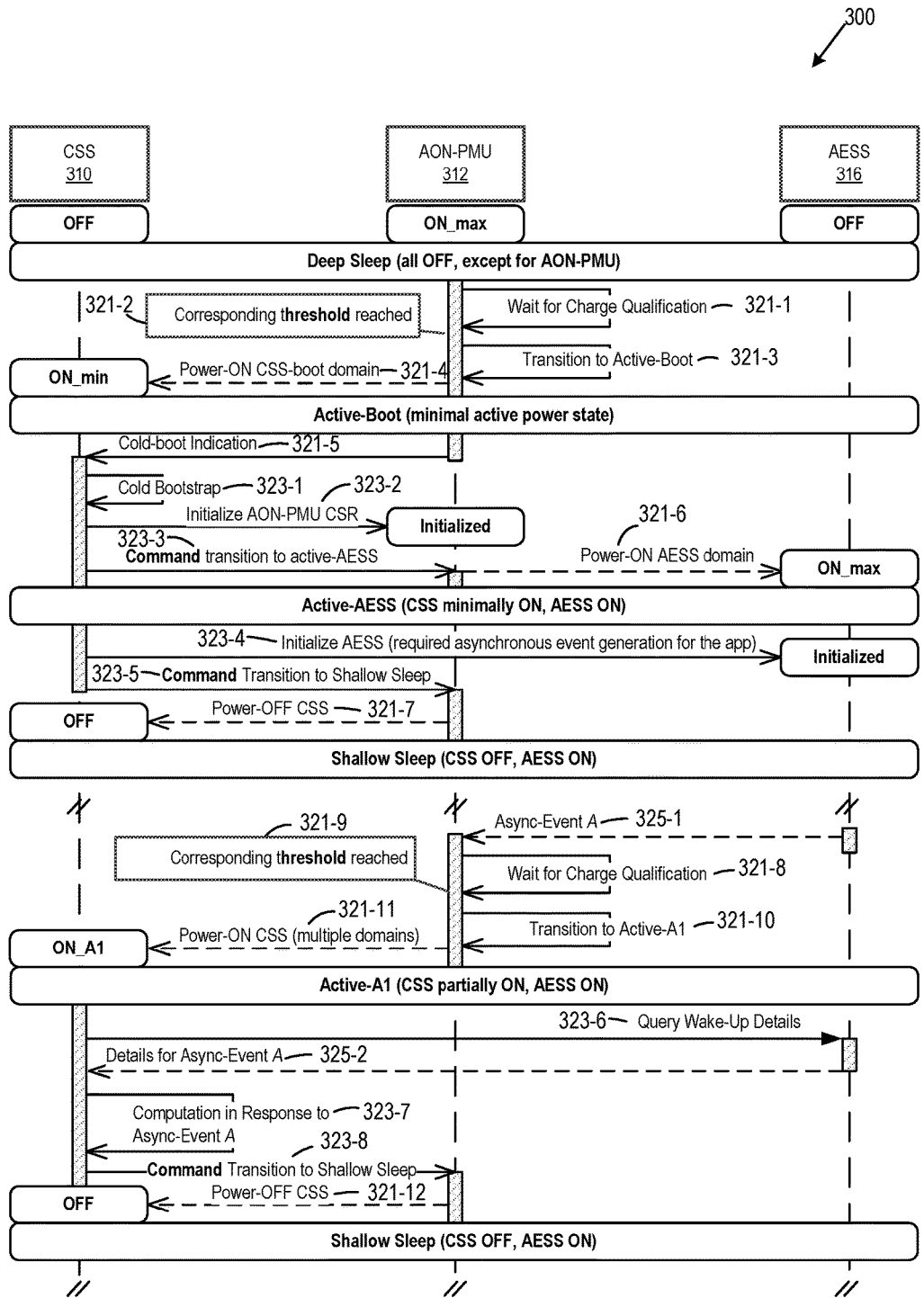
FIGS. 3 and 4 are timing diagrams illustrating a plurality of power states of an SoC according to various embodiments.cc
Figure 4:
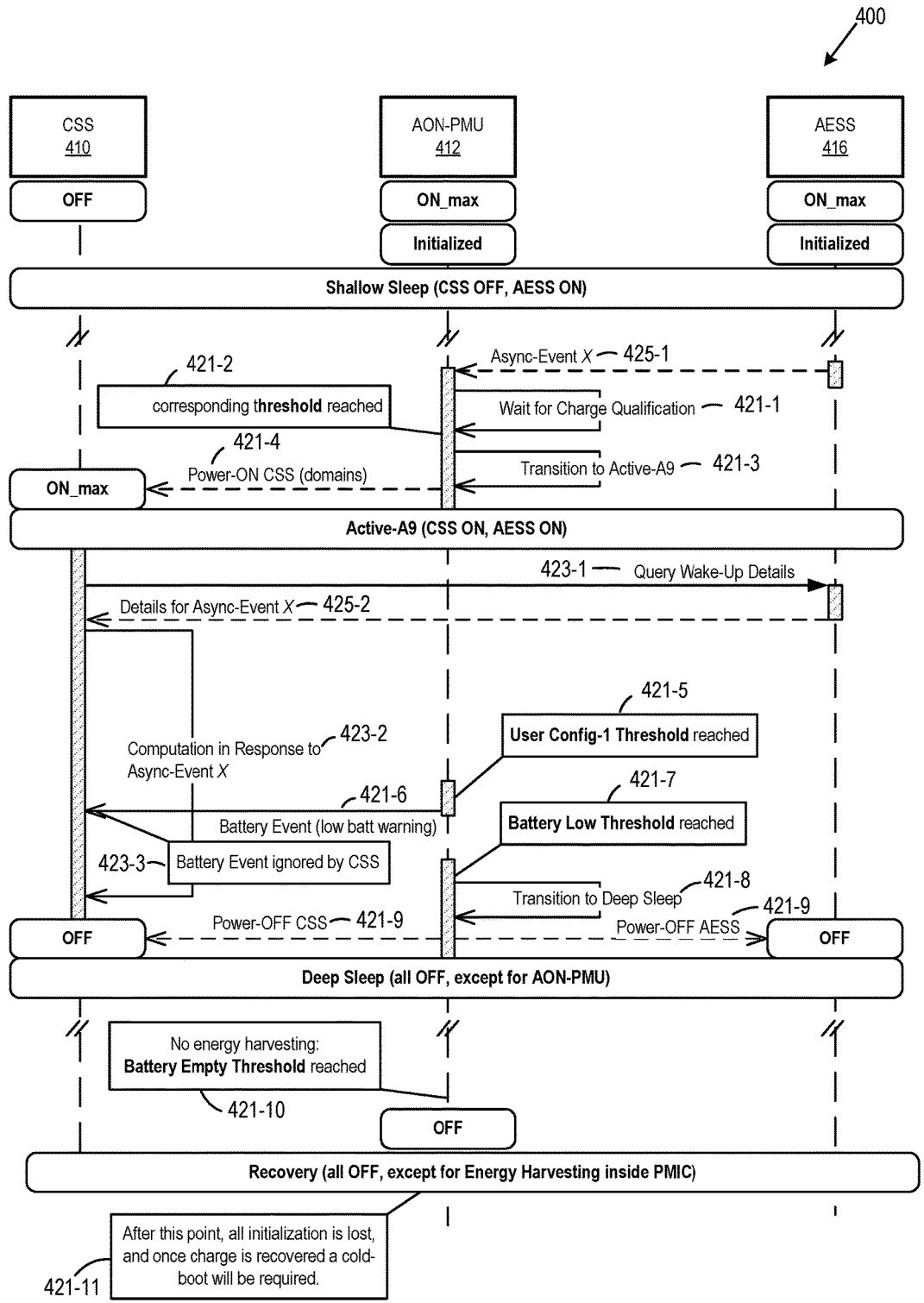

Active power states can be used to configure the CSS 110 such that CSS domains are powered off including some advanced accelerators, for example, while the domains controlling the CPU 130 and/or the I/O peripherals 136 are powered on. In FIGS. 3 and 4 the designators A1 and A9 are used to indicate different power on states with different configurations of power domains being powered on.

In some power states, the configuration of some power domains may not be forced, but the power domains are allowed to be configured by registers in control and status register (CSR) of the PMU 112. For example, the memory power domains (e.g., different memory banks may belong to different domains to allow them to be switched on/off separately) may be configured to be powered on or off in some sleep states. If the SoC 100 is in such a power state, then no "fixed" configuration can be implemented on the memory power domains; instead, the configurations can be taken from CSR registers. While the SoC 100 is in an active power state, the CPU 130 can pre-configure the CSR registers before transitioning to a sleep state to ensure that memory power domains are kept in the required configuration during the sleep power state.

The subsystem (CSS 110, AESS 116) can also be assigned a logical subsystem power state. The subsystems can be defined based on the possible configurations of the power domains of each subsystem even if the subsystems do not have a specific FSM 126 handling such states.

If the CSS 110 had in total three power domains, then at most it can have 2"3=8 power states representing the possible combinations of on or off states for each domain in the subsystem. The possible combinations of on or off states for each domain in the subsystem may represent valid states in congruence with the FSM 126, the FSM 126 governing the power management for the SoC 100.

In some embodiments, the AESS 116 can also be covered and/or composed of a plurality of power domains. Each of the plurality of power domains can be independently controlled. The AESS 116 may be in any of a plurality of power states corresponding to specific configurations of the power domains in the subsystems. The power domains are further described below.

The AESS 116 can encapsulate the components that may generate asynchronous events needed for the system operation. The components of the AESS 116 can include alarm components, timeout components, wireless command components, and/or environment sensing event components, among others. The components can remain active even when the CSS 110 is completely powered off (e.g., when the plurality of power domains in the CSS 110 are in a power off state). The asynchronous events not encapsulated (e.g., generated) in the AESS 116 can include a cold boot indication (e.g., cold boot asynchronous event) and a signaling of a power on and/or a power reset event. The cold boot indication and the signaling of a power on and/or a power reset event can be generated by the PMU 112.

The PMU 112 can power manage the SoC 100, the CSS 110, and/or the AESS. The PMU 112 can control the SoC 100 power domains. The PMU 112 can remain on, as long as charge storage is not depleted, even when the CSS 110 and/or the AESS 116 are in a power off state (e.g., every power domain in the CSS 110 and/or every power domain in the AESS 116 are in a power off state).

The PMU 112 can be controlled by the FSM 126 (e.g., PMU FSM). In some embodiments, a plurality of power states are described. The power states are not limited to the embodiments described here, but can describe more or fewer power states than those described.

The power states can be divided into one or more active power states, one or more sleep power states, and one or more recovery power states. An active power state of the CSS 110 comprises at least one compute element of the CSS 110 being in a power on state. Each of the power states can describe a different subset of the CSS 110 and/or the AESS 116 domains being powered on and/or off where at least one CSS 110 power domain is powered on. Otherwise, the CSS 110 power domain is one of the sleep power states. In some examples, the compute elements in the CSS 110 can be powered off and the AESS 116 components can be powered on or off when the SoC 100, CSS 110, and/or the AESS 116 are in a sleep power state. In some embodiments, the memory 132 (e.g., a subset or a complete set of the memory) may be in a power on state on some sleep power states.

An active power state can be any power state where at least one power domain (e.g., a not memory specific power domain) in the CSS 110 is powered on. Different combinations of power domains being on and off can result in different active power states with different energy requirements. During active power states asynchronous events can be translated to IRQ.

A sleep power state can include any power state where the CSS 110 is completely powered off. In some examples, the memory 132 or a subset of the memory 132 may be in a power on state when the CSS 110 is in a power off state. Given that the memory 132 is not a compute element but a storage element, the memory 132 may be in a power on state without implying compute activity in the CSS 110. In some examples, there may be other power configurations for memory other than a power on state and a power off state. For example, the memory can be in a retention power state and/or a memory I/O off power state, among others. Different combinations of AESS power domains being on or off can result in different sleep power states with different energy requirements. During sleep power states, asynchronous events can be translated to a WS. A recovery power state can include a minimal power consumption state used during a power outage. The CSS 110 and/or the AESS 116 may be completely powered off during a recovery power state. Portions of the PMU 112 may also be powered off during a recovery power state.

The PMU 112 can be a slave of the fabric 114 (e.g., SoC interconnection fabric) allowing the CSS 110 to drive power management during active states and to configure the PMU 112 to wake up the system under the requested circumstance on the next sleep period. In some examples, the CPU 130 can drive power management. However, any master of the fabric 114 may be configured to drive power management.

A master of the fabric 114 may include any of the CPU 130, the memory 132, the accelerator 134, the I/O peripherals 136, the CSS 110, the AESS 116, any components of the AESS 116 (e.g., the timers 138, the wireless communication interface 140, and/or the sensors 142, among other components of the SoC 100.

Figure 2A:
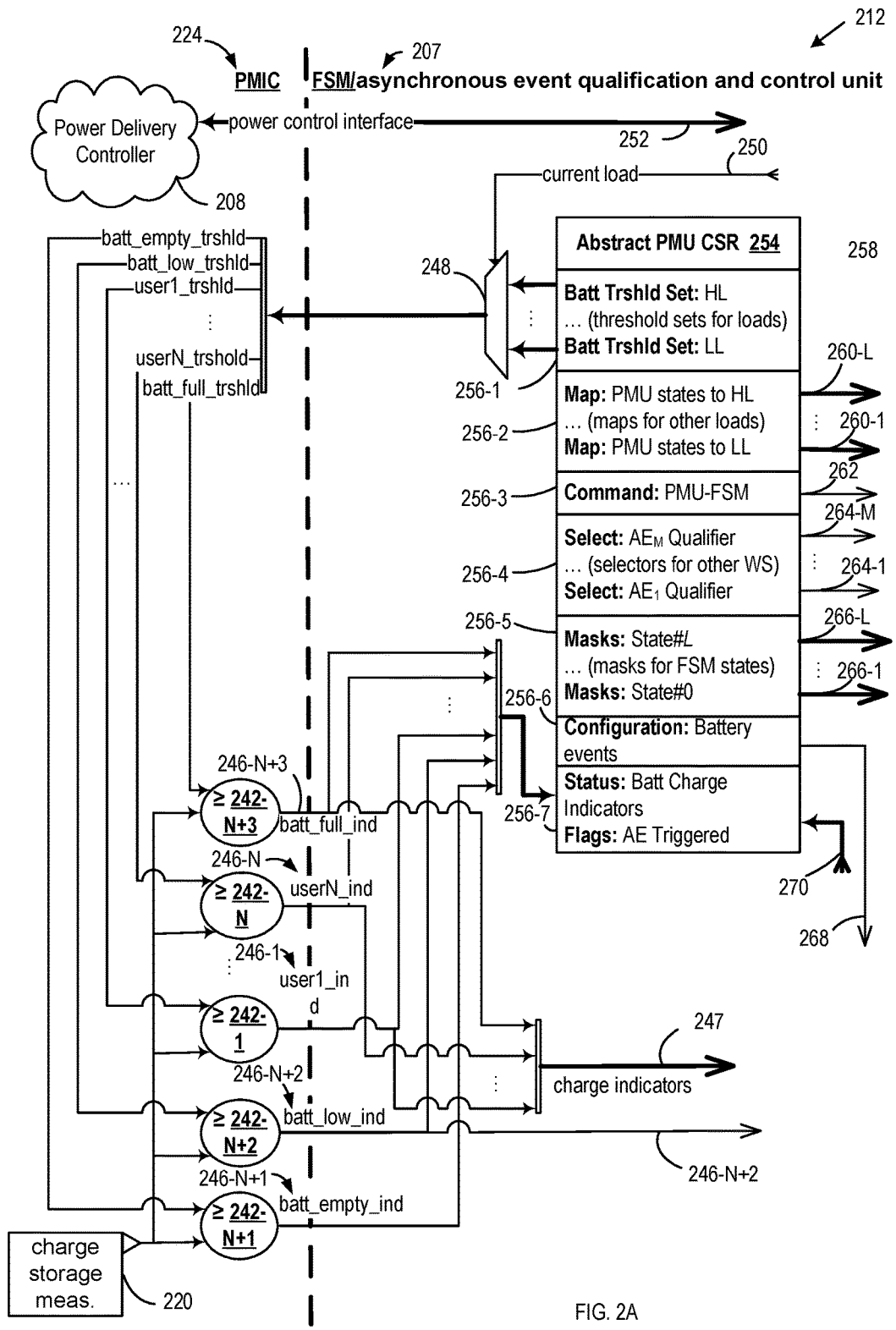
FIGS. 2A and 2B are block diagrams illustrating a PMU according to various embodiments.
Figure 2B:
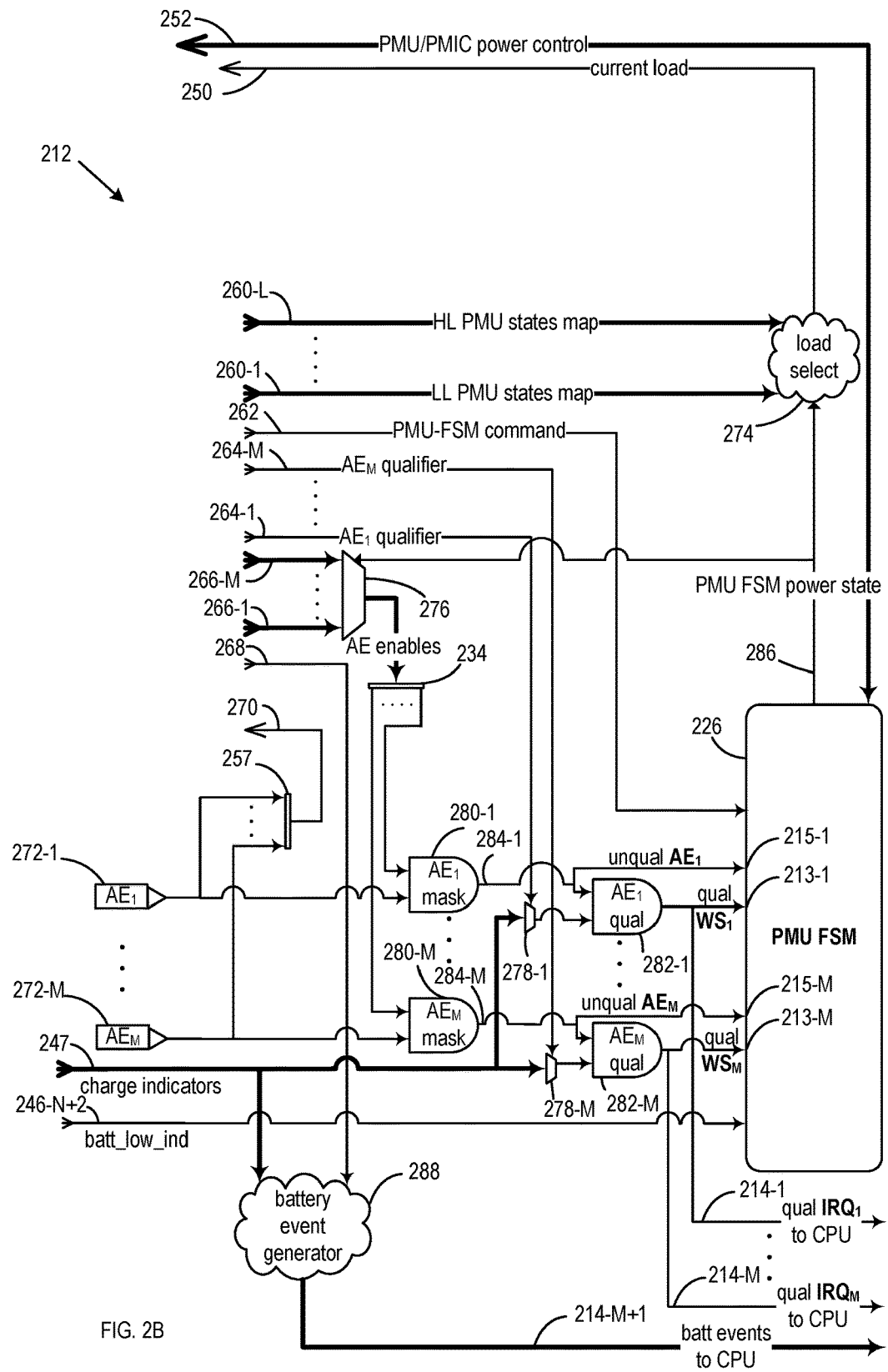

FIGS. 2A and 2B are block diagrams illustrating a PMU according to various embodiments. A PMU 212 is analogous to the PMU 112 in FIG. 1. The PMU 212 includes an analog component labeled as PMIC 224 and a digital component labeled as FSM/asynchronous event qualification and control unit 207. The PMIC 224 can include a power delivery controller 208; a plurality of comparators 242-1, ..., 242-N, 242-N+1, 242-N+2, and 242-N+3, referred to generally as comparators 242; and a charge storage measurement 220. The charge storage measurement 220 can also be referred to as a voltage based measurement and/or a battery measurement. The charge storage measurement 220 can be an analog signal that can be compared by the comparators 242 (e.g., analog comparators). As used in FIGS. 2A and 2B, L represents the number of states in the FSM 226, M represents the number of asynchronous events; and N represents the number of user configurable battery thresholds.

A charge storage monitoring of the charge storage measurement 220 can be based on the comparators 242 (e.g., the threshold based voltage comparators) to reduce power consumption. The comparators 242 can include threshold based voltage comparators. In some examples, the comparators 242 can have a configurable threshold based property to enable the comparators 242 to be reconfigurable. If the comparators 242 are voltage based, the charge storage measurement 220 is a voltage measurement and the comparators 242 can enable a reduction in the power consumption of the SoC. In some examples, the voltage based monitoring can include a measurement biased on the system load.

The charge storage monitoring can be biased based on the system load. For example, the multiplexer (MUX) 248 can receive a plurality of battery thresholds from a battery threshold set register 256-1 and can select a correct threshold set to compensate for the charge storage measurement bias due to the system load. The plurality of battery thresholds can include a threshold set for each predefined system load level (e.g., LL to HL). The MUX 248 can select a single threshold set from the inputs (e.g., the single threshold set corresponding to the current load provided via line 250). That is, the MUX 248 can select a battery threshold set based on the current load. The battery threshold set can include a threshold for each comparator 242. As such, N+3 thresholds can be selected by the MUX 248.

The PMIC 224 charge storage monitoring can generate a plurality of charge indicators that can be communicated using lines 246-1, ..., 246-N, 246-N+1, 246-N+2, and 246-N+3, referred to generally as lines 246. Each of the plurality of charge indicators can be generated by a corresponding comparator from the comparators 242.

The charge indicators can have specific purposes. For example, the charge indicator N+3, generated by the comparator 242-N+3, can be a full battery indicator (e.g., batt_full_ind) describing that a maximum charge storage capacity is reached. If the charge indicator N+3 is activated then the recharging of a power source can be stopped.

The charge indicator N+2, generated by the comparator 242-N+2, can be a low battery indicator (e.g., battery_low_ind). The charge indicator N+2 can describe a minimum charge storage needed to sustain an active power state. The charge indicator N+2 can be directly coupled to an FSM 226 via the line 246-N+2. The FSM 226 can transition the FSM/asynchronous event qualification and control unit 207, the CSS, and/or the AESS to a sleep state upon detecting the activation of the charge indicator N+2. The FSM 226 can transition to a sleep power state when a charge indicator N+2 is de-asserted.

The charge indicator N+1, generated by the comparator 242-N+1, can be an empty battery indicator (e.g., batt_empty_ind). The charge indicator N+1 can describe a minimum charge storage needed to sustain the sleep power state. The FSM 226 can transition to a recovery power state when the charge indicator N+1 is de-asserted.

The remaining charge indicators 1 to N (e.g., userl_ind to userN_ind) can be configured for generic usage as charge qualifiers of asynchronous events as for battery event generation. The charge indicators 1 to N, joined with the charge indicator N+1 and further joined with a constant true value (not shown), can represent the charge qualification options. The constant true value option within the charge qualification options can represent a bypass for the qualification process. For example, one of the charge indicators 1 to N can describe a threshold for sleep power states usage such as a WS energy qualifier.

As used herein, a WS is an asynchronous event that is enabled and that occurs during a sleep power state. An asynchronous event is enabled if the asynchronous event is not masked and is allowed to pass through a corresponding one of the AND gates 280-1 to 280-M and 282-1 to 282-M, referred to generally as AND gates 280. As such, not every asynchronous event is a WS. If the asynchronous event is masked and/or disabled, the asynchronous event is not considered a WS. A qualified WS is a WS that has been qualified by the selected option from the charge qualification options.

The charge indicators 1 to N can also describe a threshold for an active power state usage such as an IRQ energy qualifier and/or a battery event generation. An IRQ can be an asynchronous event that is enabled and charge qualified while in an active state. As such, not every asynchronous event is an IRQ. The charge indicators 1 to N and the charge indicator N+3 can be processed by a control circuitry. As used herein, the control circuitry can include the battery charge indicator stored in a status and flag register 256-7.

To increase flexibility, the charge indicators as well as the triggered asynchronous events can be stored in the CSR to be freely accessible by a CPU during active power states.

FIG. 2B also shows connectors 257 and 234, the MUXs 276, 278-1 to 278-M, and the AND gates 280 (e.g., logical conjunctions), among other possible circuitry components. As used herein, the connector 257 can be the aggregation of the asynchronous events that have occurred for the asynchronous events triggered stored in the status and flag register 256-7. The connector 234 can receive the aggregation of the asynchronous event enables (e.g., the asynchronous event enable mask). The MUX 276 can select an asynchronous event enable mask from the plurality of asynchronous event enable masks chosen based on the current FSM state. The charge indicators can be coupled to the MUXs 278-1 to 278-M.

The power control interface 252 shown between FSM/asynchronous event qualification and control unit 207 and PMIC 224 portions of PMU 212 is a custom interface allowing the FSM/asynchronous event qualification and control unit 207 to request power/voltage rail control from the PMIC 224, and the PMIC 224 to acknowledge the FSM/asynchronous event qualification and control unit 207 when the request is done.

The PMU 212 can also include a CSR 254 (e.g., control and status register file). Although not shown in the figure, the CSR 254 is accessible from the SoC fabric to enable the CSS to drive power management during active power states and to enable the CSS to configure the PMU 212 for the required wake conditions during a next sleep power state. The CSR 254 includes abstract registers used for the proposed PMU 212. The CSR 254 includes the battery threshold set register 256-1, a map register 256-2, a command register 256-3, a select register 256-4, a mask register 256-5, a configuration register 256-6, and the status and flag register 256-7. The CSR 254 can include more or fewer registers than those described herein. The masks register 256-5 can comprise multiple mask registers, with each mask register corresponding to one of the system power states. The battery threshold set register 256-1 can comprise multiple set registers, each multiple set register (e.g., set register) corresponding to a predefined system load.

To make the PMU 212 functionality robust against the PMIC battery monitoring dependence on the system load, a configurable mapping of the FSM power states to system load levels is available in the map register 256-2. Each entry in a map register indicates which power states belong to a specific system load level (e.g., high load: HL, low load: LL). A load select block 274 utilizes the mappings inscribed in the map register 256-2, along with the FSM current power state, to determine the current system load. In some examples, the system load selection may utilize other information not depicted in FIGS. 2A and 2B. The other information can include PMIC status signals that may be made available through the power control interface. The load select block can include hardcoded rules to ignore the map registers under specific circumstances (e.g., when the current power state is a recovery power state.

The FSM current power state can be any one of L states. The map register 256-2 can indicate one or more of the FSM power states via the lines 260-1 to 260-L which can be received by the load select block 274. The load select block 274 can also receive a PMU FSM power state transmitted through a line 286. The PMU FSM power state can be generated by the FSM 226.

To make the PMU charge storage monitoring reusable, the charge thresholds for the PMIC 224 are configurable via the battery threshold set register 256-1. As previously described, the battery threshold set register 256-1 can comprise multiple battery threshold sets. The charge thresholds are thresholds at which the comparators 242 are set. In some embodiments, one battery threshold set is available per system load level and the set is selected based on the current system load transferred via line 250. A threshold set is composed of one threshold for each of the comparators 242. If thresholds are assigned monotonically increasing, charge state monitor can represent a thermometer scale. The charge storage monitored state and/or the charge indicators are captured in a status portion (e.g., status register) of the status and flag register 256-7.

To enable the PMU energy qualification of asynchronous events via lines 272-1 to 272-M the asynchronous events pass through the AND gates 280 (e.g., masking gates). After passing through the AND gates 280, the asynchronous events are qualified by one of the charge qualifying options comprising the generic charge indicators from 1 to N, the charge indicator N+3, and/or the constant true value (not shown). The N+1 generic usage charge indicators (e.g., the battery full indicator provided via line 246-N+3 can also be an option) can be selected via the select register 256-4. The lines 272-1 to 272-M are analogous to the asynchronous event line 118 in FIG. 1. In some examples, a qualification can be forced (e.g., no charge indication is used to qualify, and instead a true value is constantly presented). Energy qualification selector sets (e.g., for asynchronous events) can exist for each system load, and a set can be selected based on the current system load (not shown in FIGS. 2A and 2B). The energy qualification selector sets can be implemented similarly to the battery threshold set selection based on the system load. The configuration of the select register 256-4 can be provided to the MUXs 278-1 to 278-M via lines 264-1 to 264-M. Each of the MUXs 278-1 to 278-M is also coupled to the lines 247 conveying the charge indicators.

Each of the AND gates 282-1 to 282-M can receive as input the output of the MUXs 278-1 to 278-M and the output of the AND gates 280-1 to 280-M. The output of the AND gates 282-1 to 282-M can be qualified asynchronous events (e.g., qualified WSs during sleep power states, or IRQs during active power states). In some examples, the output of the AND gates 280-1 to 280-M can also be provided to the FSM 226 via lines 215-1 to 215-M to convey unqualified asynchronous events.

A configuration to enable a plurality of asynchronous events masking independently on each system load level is available in the masks register 256-5. The configuration of the masks register 256-5 is coupled to the lines 266-1 to 266-L. One mask is available per system load level. That is, each of the lines 266-1 to 266-L is a mask for a different system power state. Distinct asynchronous events may be enabled via the lines 266-1 to 266-L during active power states as IRQs (e.g., via lines 214-1 to 214-M) and during sleep power states as WSs (e.g., via lines 213-1 to 213-M). The current masking can be selected based on the current system load and/or the FSM power state 286 (e.g., power state provided via line 286). That is, a MUX 276 can receive, as input, the lines 266-1 to 266-M. The MUX 276 can select the corresponding masks based on the FSM power state 286. The MUX 276 can output an M-bit signal. The enabled masks can be coupled to a connector 234 and to the AND gates 280-1 to 280-M. The connector 234 separates an M-bit signal into M separate 1-bit signals. The M separate 1-bit signals can be coupled to the AND gates 280-1 to 280-M. The AND gates 280-1 to 280-M can also be coupled to the lines 272-1 to 272-M conveying the asynchronous events. As such, the masks register 256-5 can store a number of configurations that can be used as masks to enable or disable a number of asynchronous events based on the FSM power state 286.

The asynchronous events can be captured in the status and flag register 256-7. The status and flag register 256-7 can include a status register and a flag register. The asynchronous events can be stored in the flag register that is part of the status and flag register 256-7. For example, the asynchronous events can pass through the connector 257. The asynchronous events can also pass through line 270 and can be stored in the flag register that is part of the status and flag register 256-7. The status register can capture the state of a charge indication.

For active power states, the CSS drives FSM 226 through commands available via the command register 256-3. The command register 256-3 can be coupled to a line 262. The line 262 can communicate a plurality of commands provided from the CSS to the FSM 226. Commands can drive power state transitions between active states as well as from active states to sleep states. During active states, CSS operation may be interrupted by battery qualified IRQs and battery events via lines 214-1 to 214-M and line 214-M+1, respectively. A line 268 is the configuration that specifies which battery events the PMU is allowed to generate, which in turn is coupled to the configuration register 256-6. The configuration of which battery events are of interest to the CSS can be configured via the configuration register 256-6. That is, the CSS can store a configuration of which the battery events can be generated by the PMU during active power states in the configuration register 256-6. The configuration for battery event generation can be communicated to a battery event generator 288 via the line 268. The battery event generator 288 can also be coupled to the lines 247. In some examples, the battery event generator 288 can be coupled to line 247 and line 268.

For sleep power states, the FSM 226 can wait for the corresponding battery qualified WSs to transition to the corresponding active power state. The battery qualified WSs (e.g., qual WS1, qual WSM) can be transmitted via the lines 213-1 to 213-M. At the same time, the FSM 226 may be configured to use unqualified asynchronous events to transition between distinct sleep states. The unqualified asynchronous events can be transmitted via the lines 215-1 to 215-M.

On power state transitions, the FSM 226 can take into account the transient effect on the charge monitoring caused by system load variation and ignore the charge indicators until transients have elapsed. An abrupt power state transition (e.g., either suddenly powering up or powering down a large power domain) can cause a transient effect on the analog side of PMU (e.g., on the PMIC (battery, supply path, regulators, etc.)). This transient effect can cause the charge monitoring to receive temporary erroneous measurements for the duration of the transient effect. As such, the charge monitoring can be temporarily confused. The charge monitoring can determine that there is less charge than there actually is or the charge monitoring can determine that there is more charge than there actually is. If not properly handled, this temporary monitoring error can cause the system to behave erroneously. The exact nature and/or form of the transient effect is implementation specific. But there can be a short-term temporary effect (e.g., a transient effect or response). In some examples, the charge monitoring can be aware of the transient effect and can compensate for the transient effect in order to keep monitoring continuously. The charge monitor can also ignore the charge monitoring for the duration of the transient effect (e.g., pause monitoring until the transient effect has lapsed and the system has returned to a steady state).

FIG. 3 is a timing diagram 300 illustrating a plurality of power states of an SoC according to various embodiments. The timing diagram 300 includes a CSS 310, a PMU (e.g., AON PMU) 312, and an AESS 316.

Upon a cold start or a power on reset (POR), the PMU 312 can be initialized to a sleep power state and receive a default CSR configuration. The default CSR configurations can define that the enabled WS is a cold boot which can automatically be triggered. In some examples, only the enabled WS is a cold boot. The CSR configuration can define a default selected energy qualifier corresponding to a default charge threshold to guarantee a full cold boot procedure can be performed.

Upon reaching the cold boot charge threshold, the PMU 312 can transition to a default active power state, thus powering on a default set of CSS power domains. Additionally, the PMU 312 can also power on one or more AESS power domains. The PMU 312 can also power ON the CSS 310 and optionally the AESS 316. Once the AESS 316 has at least one power domain on (e.g., either as part of the default power state or due to a posterior command from the CSS 310), the CSS 310 (e.g., via the CPU, after it has completed a bootstrap producer) can take control and configure the AESS 316 and the PMU 312. After this point, the AESS 316 can generate asynchronous events.

While in active power states, the CSS 310 can control the system (e.g., the SoC) and the power state transitions unless a battery-low indicator is de-asserted, causing the FSM to automatically transition to a sleep state. The CSS 310 can configure a user charge indicator to signal a battery event before a charge drops below battery-low indicator to gracefully transition to a sleep power state (e.g., in a software driven fashion). The CSS 310 can configure energy qualification for any asynchronous events (e.g., IRQ), to avoid being interrupted if there is not enough energy to service the request. Depending on the application, different AESS asynchronous events may signal the need to execute different tasks. Thus, before commanding a transition to a sleep power state, the CSS 310 may reconfigure the PMU thresholds and energy qualifier selectors for every asynchronous event (e.g., WS) in order to allocate enough charge to guarantee that the corresponding application tasks can be serviced completely on a single wake-up.

While in sleep power states, the PMU 312 can control power state transitions. An enable/disable mask configuration corresponding to the current system load can be applied to AESS asynchronous events as pre-configured by the CSS 310. An energy qualification and/or an always qualified configuration can be applied to AESS asynchronous events as pre-configured by the CSS 310. An always qualified configuration is a configuration in which instead of selecting one of the comparator outputs (e.g., comparators 242-1 to 242-N and comparator 242-N+3) as a qualifier, a constant true value (not shown) is used. The MUXs 278-1 to 278-M can have an extra input that can be selected aside from the comparator outputs. The extra input can be the constant true value.

In some examples, triggered asynchronous events can be presented unqualified to the FSM, for transitions between sleep power states, and can be gated until they are energy qualified. Thus, wake up can be delayed based on charge availability. The AESS asynchronous events can be qualified and monitored simultaneously. On a charge outage scenario, the PMU 312 can automatically transition to the recovery power state and power off the CSS 310, the AESS 316, and the unnecessary elements of the AON domain (e.g., CSR). In some examples, only an automatic POR can wake up the system after a charge outage. The POR can be a cold boot event.

The timing diagram 300 can be for a normal use case. The timing diagram 300 can begin with the CSS 310 in a power off state, the PMU 312 in a power on state, and the AESS 316 in a power off state. The CSS 310, the PMU 312, and the AESS 316 can be part of an SoC as described above. The above combination of power states can be referred to as a deep sleep state of the SoC.

The PMU 312 can wait 321-1 for a qualified charge to be reached. Upon reaching 321-2 the corresponding threshold, the PMU 312 can initiate the transition 321-3 to an active boot power state which represents the power state predefined by the implementation to perform the system cold bootstrap procedure. The PMU 312 can generate and/or provide a power on command 321-4 to the CSS 310. For a cold boot, the power on command 321-4 can power on one or more of the CSS power domains as pre-defined by the definition of active boot power state (e.g., ON_m n state) for an implementation (e.g., can represent the minimal set of CSS power domains required to be powered on for booting the system). A minimal set of power domains needed for booting the system can include, for example, the memory and the CPU of the CSS 310. In some examples, fora cold boot, the PMU 312 can also generate a power on command for the AESS 316.

Upon receiving the power on command 321-4, the CSS 310 can enter a power on state (e.g., ON_min state). An active boot power state (e.g., minimum active power state) can include the CSS 310, the minimal set of CSS power domains, and the PMU 312 being in a power on state. The PMU 312 can provide a cold boot indicator 321-5 to the CSS 310. The CSS 310, upon receiving the cold boot indicator 321-5, can perform a cold bootstrap procedure 323-1. The CSS 310, via the CPU, can take control and configure the PMU 312. The CSS 310 can configure the PMU 312 by configuring the CSR. As such, the CSS 310 can initialize 323-2 the CSR (e.g., the AON-PMU CSR). The CSS 310 can also provide a command 323-3 to the PMU 312 to transition the power state of the system to a specific power state where the required AESS power domains can be powered on in addition to the CSS power domains currently on. The PMU 312 can signal the AESS 316 to power on 321-6 the requested power domains. The AESS 316 can have multiple power domains and the CSS 310 can decide to power on the power domains of the AESS 316 or a portion of the power domains of the AESS 316. The different combination of active power domains of the AESS 316 to be powered on can lead to different power states for the SoC. In the timing diagram 300, the power domains of the AESS 316 are powered on, and thus the AESS 316 enters an ON_max state. Powering on the entire set of power domains of the AESS 316 can be referenced as an active AESS power state.

The CSS 310 can initialize 323-4 the AESS 316. Initializing the AESS 316 can include requiring asynchronous event generation for an application. After this point, the AESS 316 can generate asynchronous events.

For example, the CSS 310 can generate a command 323-5 to transition the system into a shallow sleep. In response, the PMU 312 can place the CSS 310 in a power off state by generating a power off command 321-7 The CSS 310 can enter a power off state. The CSS 310 being in a power off state and the PMU 312 and the AESS 316 being in a power on state can constitute a shallow sleep power state.

The AESS 316 can generate 325-1 an asynchronous event (e.g., Async-Event A) and deliver the asynchronous event to the PMU 312. The PMU 312 can wait 321-8 for a charge qualification to be reached. Upon reaching 321-9 the corresponding threshold, the PMU 312 can transition to an active state 321-10 (e.g., Active-A1). To transition to an active state, the PMU 312 can generate a power on command 321-11 for the CSS 310. In this example, the subset of CSS power domains that will be powered on depends on a configuration provided by the CSS 310 and stored in the CSR during the cold bootstrap procedure. FIG. 3 shows a power state (e.g., Active-A1) different than the power state on the cold boot wakeup (Active-Boot). As such, the set of powered on domains in the system being powered on (e.g., CSS 310 and/or AESS 316) can be different than in an active boot state. The CSS 310 can enter an ON_A1 state, thus placing the system in an active state.

The CSS 310 can query 323-6 the AESS 316 for the wake-up details. The AESS 316 can respond by providing 325-2 the wake-up details to the CSS 310. The CSS 310 can perform 323-7 a plurality of operations corresponding to the wake-up details. The CSS 310 can then generate a command 323-8 to transition the system to a shallow sleep power state. The PMU 312 can receive the command 323-8 and can generate a command 321-12 to place the CSS 310 in a power off state. In response, the CSS 310 can enter a power off state, thus placing the system in a shallow sleep.

FIG. 4 is a timing diagram 400 illustrating a plurality of power states of an SoC according to various embodiments. Timing diagram 400 can provide an example of an extreme case. In timing diagram 400, a CSS 410 can begin in a power off state, a PMU 412 can begin in a ON_max state and can be initialized, and an AESS 416 can begin in an ON_max state and can be initialized. The above states can be a shallow sleep state.

The AESS 416 can provide an asynchronous event 425-1 to the PMU 412. The PMU 412 can wait 421-1 for a charge qualification to be reached. When the corresponding threshold is reached 421-2, the PMU 412 can transition 421-3 to an active state (e.g., active state A9). The PMU 412 can provide a power on command 421-4 to the CSS 410 (e.g., domains powered on). The CSS 410 can enter an ON_max state which can constitute an active state for the system.

The CSS 410 can query 423-1 the AESS 416 for the wake-up details. The AESS 416 can provide 425-2 the wake-up details to the CSS 410. The CSS 410 can perform a plurality of operations 423-2 (e.g., computations) in response to receiving the asynchronous event details.

While the CSS 410 is performing the operations 423-2, the PMU 412 can determine that a charge storage has reached 421-5 a threshold (e.g., user configured 1 threshold). The PMU 412 can notify 421-6 the CSS 410 of the battery event (e.g., that the charge storage reached a threshold). The CSS 410 can react to the battery event (e.g., not shown) and complete the plurality of operations 423-2 or ignore 423-3 the battery event (e.g., shown).

The PMU 412 can determine that a low battery event is reached 421-7. The PMU 412 can transition 421-8 the system to a deep sleep. The PMU 412 can provide power off commands 421-9 to the CSS 410 and/or the AESS 416, thus placing the system in a deep sleep.

The PMU 412 can determine that the power source has reached 421-10 a battery empty threshold (e.g., if no energy harvesting has occurred). The PMU 412 can enter a power off state. After this point, the initializations (e.g., of the CSR) are lost. Once the charge is recovered, a power on reset and a cold boot can be performed 421-11.

Figure 5:
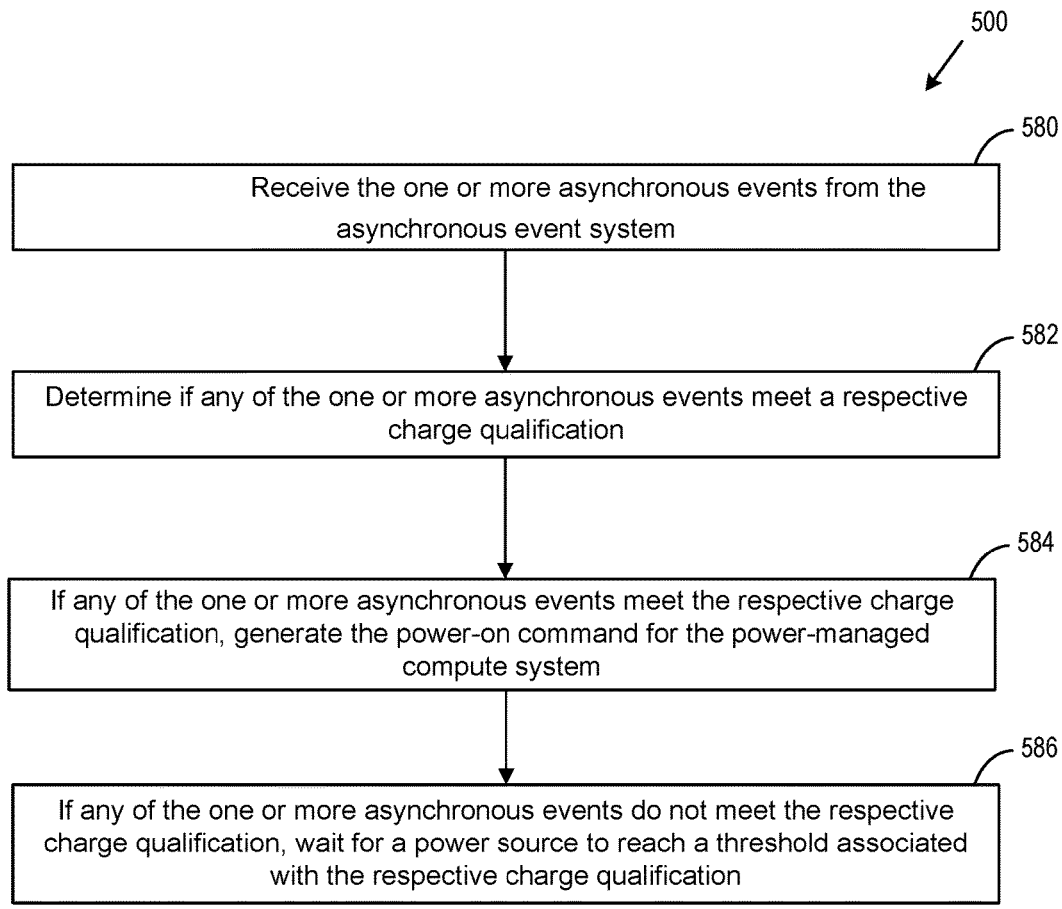
FIGS. 5, 6, and 7 are flow diagrams illustrating methods for power management of an NZE IoT device according to various embodiments.

FIG. 5 is a flow diagram illustrating a method 500 for power management of an NZE IoT device according to various embodiments. The method 500 can include receiving 580 the one or more asynchronous events from the asynchronous event system, determining 582 if any of the one or more asynchronous events meet a respective charge qualification, generating 584 the power-on command for the power-managed compute system if any of the one or more asynchronous events meet the respective charge qualification, and waiting 586 for a power source to reach a threshold associated with the respective charge qualification if any of the one or more asynchronous events do not meet the respective charge qualification The method 500 can also include entering an active state upon receiving a power-on command, drive power management during the active state of the power-managed compute system, and generate one or more asynchronous events. Determining if any of the one or more asynchronous events meet the respective charge qualification can further comprise determining whether the power source stores a charge sufficient to perform a plurality of operations associated with an asynchronous event from the one or more asynchronous events corresponding to the respective charge qualification.

Receiving the one or more asynchronous events from the asynchronous event system can further comprise processing the one or more asynchronous events from the asynchronous event system as WSs. Receiving the one or more asynchronous events can further comprise processing the one or more asynchronous events from the asynchronous event system as interrupt requests. The interrupt requests are for the power-managed compute system.

Determining if any of the one or more asynchronous events meet the respective charge qualification can comprise simultaneously determining if the asynchronous events meet the respective charge qualification. Determining if any of the one or more asynchronous events meet the respective charge qualification can also comprise independently determining if the asynchronous events meet the respective charge qualification.

Figure 6:
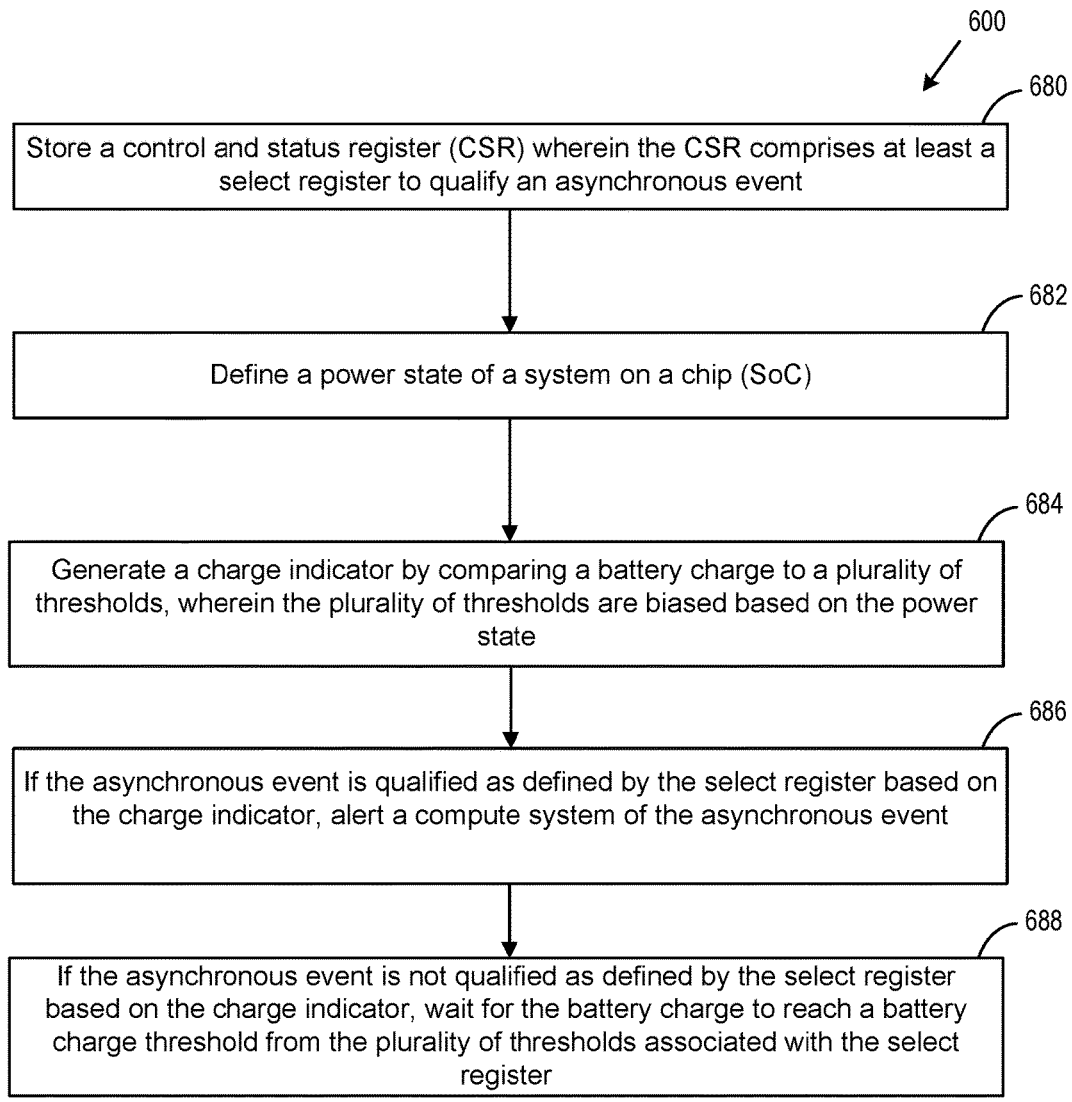

FIG. 6 is a flow diagram illustrating a method 600 for power management of an NZE IoT device according to various embodiments. The method 600 can include storing 680 a CSR wherein the CSR comprises at least a select register to qualify an asynchronous event, defining 682 a power state of an SoC, generating 684 a charge indicator by comparing a battery charge to a plurality of thresholds, wherein the plurality of thresholds are biased based on the power state, alerting 686 a compute system of the asynchronous event if the asynchronous event is qualified as defined by the select register based on the charge indicator, and waiting 688 for the battery charge to reach a battery charge threshold from the plurality of thresholds associated with the select register if the asynchronous event is not qualified as defined by the select register based on the charge indicator. In some examples, the alerting 686 and the waiting 688 can be performed concurrently (e.g., parallel) or sequentially.

The compute system can comprise a power-managed compute system. The compute system can also comprise an asynchronous event system. The battery charge threshold can be based on the power state.

The method 600 can also comprise applying a mask to determine whether to process the asynchronous event, wherein the mask is configured based on the power state. The charge indicators can be one of N+3 possible charge indicators comprising: N user defined charge indicators, a full charge indicator, a low charge indicator, and an empty charge indicator.

The CSR can further comprise a map register to define a mapping of a plurality of power states to system load levels. The CSR can also comprise a battery threshold set register to define the battery charge threshold. The CSR can comprise a status register to capture at least the charge indicator. The CSR can further comprise a mask register to map asynchronous events to power states, wherein the asynchronous event is processed if the mask register maps the asynchronous event to the power state. The CSR can also comprise a flag register to capture the asynchronous event. The CSR can comprise a command register to capture commands received from the compute system, wherein the commands configure the PMU. The CSR can further comprise a configuration register to capture battery events that can be provided to the compute system.

Figure 7:
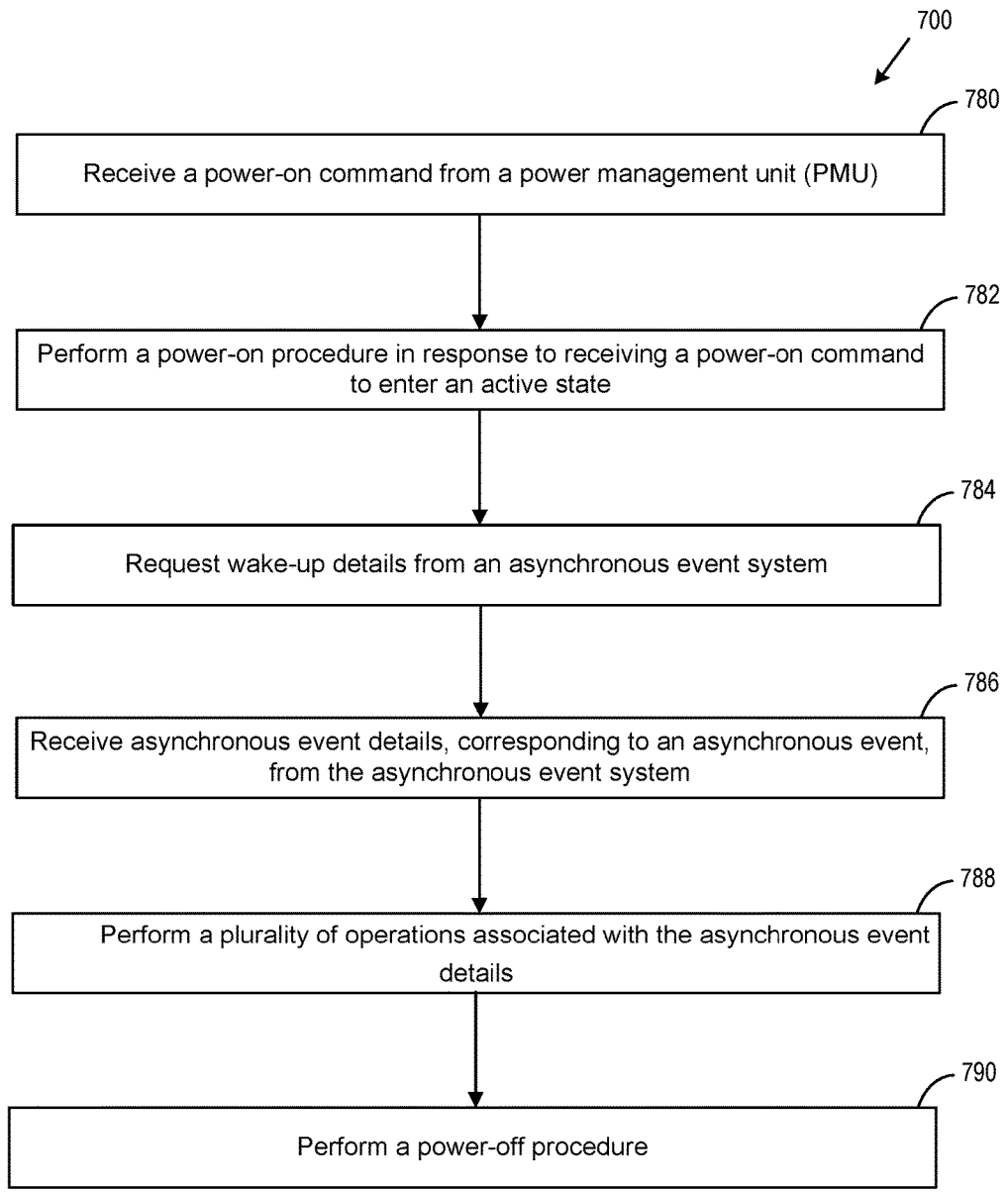

FIG. 7 is a flow diagram illustrating a method for power management of an NZE IoT device according to various embodiments. The method 700 can comprise receiving 780 a power-on command from a PMU, performing 782 a power-on procedure in response to receiving a power-on command to enter an active state, requesting 784 wake-up details from an asynchronous event system, receiving 786 asynchronous event details, corresponding to an asynchronous event, from the asynchronous event system, and performing 788 a plurality of operations associated with the asynchronous event details, and performing 790 a power-off procedure.

The method 700 can further comprise generating a power-off command for the PMU instructing the PMU to generate a power-off command for the power-managed compute system. The method 700 can also comprise updating a CSR to provide the PMU commands for managing a power state of the power-managed compute system. The method 700 can also comprise updating a CSR to provide the PMU commands for managing a power state of the asynchronous event system. The active state can include one of a plurality of power domains.

In some examples, a computing device (e.g., SoC) may include one or more processors, each with one or more processor cores, accelerators, system memory, and a memory controller. The system memory may be any volatile or non-volatile memory. Additionally, the computing device may include mass storage devices. Examples of the mass storage devices may include, but are not limited to, tape drives, hard drives, compact disc read-only memory (CD-ROM), and so forth. Further, the computing device may include input/output devices (such as display, keyboard, cursor control, and so forth) and communication interfaces (such as wireless and/or wired communication/network interface cards, modems, and so forth). The elements may be coupled to each other via a system bus, which may represent one or more buses. In the case of multiple buses, they may be bridged by one or more bus bridges.

Each of these elements may perform its conventional functions known in the art. The system memory and the mass storage devices may be employed to store a working copy and a permanent copy of the programming instructions implementing a number of operations referred to as computational logic. The memory controller may include internal memory to store a working copy and a permanent copy of the programming instructions (e.g., machine reference code (MRC)) implementing a number of operations associated with MRC training. The computational logic may be implemented by assembler instructions supported by the processor(s) or high-level languages, such as, for example, C, that can be compiled into such instructions.

The number, capability, and/or capacity of these elements may vary, depending on whether the computing device is used as a mobile device, such as a wearable device, a smartphone, a computer tablet, a laptop, and so forth, or a stationary device, such as a desktop computer, a server, a game console, a set-top box, an infotainment console, and so forth.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may generally be referred to as a "circuit," "module," or "system." Furthermore, the present disclosure may take the form of a computer program product embodied in any tangible or non-transitory medium of expression having computer-usable program code embodied in the medium.

A non-transitory computer-readable storage medium may include a number of programming instructions. The programming instructions may be configured to enable a device in response to execution of the programming instructions, to implement (aspects of) the SoC 100 in FIG. 1, as earlier described. In alternative embodiments, the programming instructions may be disposed on a multiple non-transitory computer-readable storage media instead. In still other embodiments, the programming instructions may be disposed on the multiple non-transitory computer-readable storage media, such as signals.

Any combination of one or more computer-usable or computer-readable medium(s) may be utilized. The computer-usable or computer-readable medium may be, for example, but not limited to, an electronic, a magnetic, an optical, an electromagnetic, an infrared, or a semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++, or the like and conventional procedural programming languages, such as the "C" programming language or similar programming languages. The program code may execute entirely on the user's computer; partly on the user's computer, as a stand-alone software package; partly on the user's computer and partly on a remote computer; or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide processes for implementing the functions/acts specified in the flowchart, block diagram block or blocks, and/or timing diagrams.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an," and "the" are intended to include plural forms as well, unless the context clearly indicates otherwise. It will be further understood that the terms "comprises" and/or "comprising," when used in this specification, are specific to the presence of stated features, integers, steps, operations, elements, and/or components, but do not preclude the presence or addition of one or more other features, integers, steps, operation, elements, components, and/or groups thereof.

Embodiments may be implemented as a computer process, a computing system, or an article of manufacture such as a computer program product of computer-readable media. The computer program product may be a computer storage medium readable by a computer system and encoding computer program instructions for executing a computer process.

The corresponding structures, material, acts, and equivalents of means or steps plus function elements in the claims below are intended to include any structure, material, or act for performing the function in combination with other claimed elements. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment was chosen and described in order to best explain the principles of the disclosure and the practical application, and to enable others of ordinary skill in the art to understand the disclosure for embodiments with various modifications as are suited to the particular use contemplated.

For one embodiment, at least one of the processors may be packaged together with memory, as earlier described. For one embodiment, at least one of the processors may be packaged together with memory, to form a System in Package (SiP). For one embodiment, at least one of the processors may be integrated on the same die with memory. For one embodiment, at least one of the processors may be packaged together with memory, to form an SoC. For at least one embodiment, the SoC may be utilized in, for example, but not limited to, a wearable device, a smartphone, or a computing tablet.

Thus various example embodiments of the present disclosure have been described, including, but not limited to:

Example 1 is an apparatus for managing power of a net-zero energy (NZE) Internet of things (IoT) device. The apparatus includes a power-managed compute system including memory and one or more processing units, the power-managed compute system designed to enter an active state upon receiving a power-on command and drive power management during the active state of the power-managed compute system. The apparatus includes an asynchronous event system designed to generate one or more asynchronous events. The apparatus includes a power management unit designed to receive the one or more asynchronous events from the asynchronous event system and determine if any of the one or more asynchronous events meet a respective charge qualification. The apparatus includes a power management unit designed to if any of the one or more asynchronous events meet the respective charge qualification, generate the power-on command for the power-managed compute system, and if any of the one or more asynchronous events do not meet the respective charge qualification, wait for a power source to reach a threshold associated with the respective charge qualification.

Example 2 is the apparatus of Example 1, where the power management unit designed to determine if any of the one or more asynchronous events meet the respective charge qualification is further designed to determine whether the power source stores a charge sufficient to perform a variety of operations associated with an asynchronous event from the one or more asynchronous events corresponding to the respective charge qualification.

Example 3 is the apparatus of Example 1, where the power management unit designed receive the one or more asynchronous events from the asynchronous event system are further design to process the one or more asynchronous events from the asynchronous event system as wake sources.

Example 4 is the apparatus of Example 1, where the power management unit designed to receive the one or more asynchronous events from the asynchronous event system is further designed to process the one or more asynchronous events from the asynchronous event system as interrupt requests.

Example 5 is the apparatus of Example 1, where the interrupt requests are for the power-managed compute system.

Example 6 is the apparatus of Example 1, where the power management unit designed to determine if any of the one or more asynchronous events meet the respective charge qualification further includes instructions to simultaneously determine whether the one or more asynchronous events meet the respective charge qualification.

Example 7 is the apparatus of Example 1, where the power management unit designed to determine if any of the one or more asynchronous events meet the respective charge qualification further includes instructions to independently determine whether the one or more asynchronous events meet the respective charge qualification.

Example 8 is a power management unit (PMU). The PMU includes memory designed to store a control and status register (CSR) where the CSR includes at least a select register to qualify an asynchronous event and a PMU finite state machine (FSM) designed to define a power state of a system on a chip (SoC). The PMU includes power management integrated circuitry including a variety of comparators designed to generate a charge indicator by comparing a battery charge to a variety of thresholds, where the variety of thresholds are biased based on the power state. The PMU includes control circuitry designed to if the asynchronous event is qualified as defined by the select register based on the charge indicator, alert a compute system of the asynchronous event, and if the asynchronous event is not qualified as defined by the select register based on the charge indicator, wait for the battery charge to reach a battery charge threshold from the variety of thresholds associated with the select register.

Example 9 is the PMU of Example 8, where the compute system includes a power-managed compute system.

Example 10 is the PMU of Example 8, where the compute system includes an asynchronous event system.

Example 11 is the PMU of Example 8, where the battery charge threshold is based on the power state.

Example 12 is the PMU of Example 8, where the control circuitry is further designed to apply a mask to determine whether to process the asynchronous event, where the mask is designed based on the power state.

Example 13 is the PMU of Example 8, where the charge indicator is one of N+3 possible charge indicators including: N user defined charge indicators, a full charge indicator, a low charge indicator, and an empty charge indicator.

Example 14 is the PMU of Example 8, where the CSR further includes a map register to define a mapping of a variety of power states to system load levels.

Example 15 is the PMU of Example 8, where the CSR further includes a battery threshold set register to define the battery charge threshold.

Example 16 is the PMU of Example 8, where the CSR further includes a status register to capture at least the charge indicator.

Example 17 is the PMU of Example 8, where the CSR further includes a mask register to map asynchronous events to power states, where the asynchronous event is processed if the mask register maps the asynchronous event to the power state.

Example 18 is the PMU of Example 8, where the CSR further includes a flag register to capture the asynchronous event.

Example 19 is the PMU of Example 8, where the CSR further includes a command register to capture commands received from the compute system, where the commands design the PMU.

Example 20 is the PMU of Example 8, where the CSR further includes a configuration register to capture battery events that can be provided to the compute system.

Example 21 is a computer-readable storage medium. The computer-readable storage medium having stored thereon instructions that, when implemented by a power-managed compute system, cause the power-managed compute system to: receive a power-on command from a power management unit (PMU), perform a power-on procedure in response to receiving a power-on command to enter an active state, and request wake-up details from an asynchronous event system. The computer-readable storage medium having stored thereon instructions that, when implemented by a power-managed compute system, cause the power-managed compute system to: receive asynchronous event details, corresponding to an asynchronous event, from the asynchronous event system, perform a variety of operations associated with the asynchronous event details, and perform a power-off procedure.

Example 22 is the computer-readable storage medium of Example 21, where the instructions are further designed to generate a power-off command for the PMU instructing the PMU to generate a power-off command for the power-managed compute system.

Example 23 is the computer-readable storage medium of Example 21, where the instructions are further designed to update a control and status register (CSR) to provide the PMU commands for managing a power state of the power-managed compute system.

Example 24 is the computer-readable storage medium of Example 21, where the instructions are further designed to update the CSR to provide the PMU commands for managing a power state of the asynchronous event system.

Example 25 is the computer-readable storage medium of Example 21, where the active state includes one of a variety of power domains.

Example 26 is a method to manage power of a net-zero energy (NZE) internet of things (IoT) device. The method includes receiving the one or more asynchronous events from the asynchronous event system and determining if any of the one or more asynchronous events meet a respective charge qualification. The method also includes if any of the one or more asynchronous events meet the respective charge qualification, generating the power-on command for the power-managed compute system, and if any of the one or more asynchronous events do not meet the respective charge qualification, waiting for a power source to reach a threshold associated with the respective charge qualification.

Example 27 is the method of Example 26, where determining if any of the one or more asynchronous events meet the respective charge qualification further includes determining whether the power source stores a charge sufficient to perform a variety of operations associated with an asynchronous event from the one or more asynchronous events corresponding to the respective charge qualification.

Example 28 is the method of Example 26, where receiving the one or more asynchronous events from the asynchronous event system further includes processing the one or more asynchronous events from the asynchronous event system as wake sources.

Example 29 is the method of Example 26, where receiving the one or more asynchronous events from the asynchronous event system further includes processing the one or more asynchronous events from the asynchronous event system as interrupt requests.

Example 30 is the method of Example 26, where the interrupt requests are for the power-managed compute system.

Example 31 is the method of Example 26, where determining if any of the one or more asynchronous events meet the respective charge qualification further includes simultaneously determining whether the one or more asynchronous events meet the respective charge qualification.

Example 32 is the method of Example 26, where determining if any of the one or more asynchronous events meet the respective charge qualification further includes independently determining whether the one or more asynchronous events meet the respective charge qualification.

Example 33 is a method to manage power of a net-zero energy (NZE) internet of things (IoT) device. The method includes storing, in memory, a control and status register (CSR) where the CSR includes at least a select register to qualify an asynchronous event, defining, via a PMU finite state machine (FSM), a power state of a system on a chip (SoC), and generating, via power management integrated circuitry, a charge indicator by comparing a battery charge to a variety of thresholds, where the variety of thresholds are biased based on the power state. The method also includes if the asynchronous event is qualified as defined by the select register based on the charge indicator, alerting a compute system of the asynchronous event, and if the asynchronous event is not qualified as defined by the select register based on the charge indicator, waiting for the battery charge to reach a battery charge threshold from the variety of thresholds associated with the select register.

Example 34 is the method of Example 33, where the compute system includes a power-managed compute system.

Example 35 is the method of Example 33, where the compute system includes an asynchronous event system.

Example 36 is the PMU of Example 33, where the battery charge threshold is based on the power state.

Example 37 is the method of Example 33, further including applying a mask to determine whether to process the asynchronous event, where the mask is designed based on the power state.

Example 38 is the method of Example 33, where the charge indicator is one of N+3 possible charge indicators includes: N user defined charge indicators, a full charge indicator, a low charge indicator, and an empty charge indicator.

Example 39 is the method of Example 33, further includes defining a mapping of a variety of power states to system load levels via a map register.

Example 40 is the method of Example 33, further includes defining the battery charge threshold via a battery threshold set register.

Example 41 is the method of Example 33, further includes capturing at least the charge indicator via a status register.

Example 42 is the method of Example 33, further includes mapping asynchronous events to power states via a mask register, where the asynchronous event is processed if the mask register maps the asynchronous event to the power state.

Example 43 is the method of Example 33, further includes capturing the asynchronous event via a flag register.

Example 44 is the method of Example 33, further includes capturing commands received from the compute system via a command register, where the commands design the PMU.

Example 45 is the method of Example 33, further includes capturing battery events that can be provided to the compute system via a configuration register.

Example 46 is a method to manage power of a net-zero energy (NZE) internet of things (IoT) device. The method includes receiving a power-on command from a power management unit (PMU), performing a power-on procedure in response to receiving a power-on command to enter an active state, and requesting wake-up details from an asynchronous event system. The method also includes receiving asynchronous event details, corresponding to an asynchronous event, from the asynchronous event system, performing a variety of operations associated with the asynchronous event details, and performing a power-off procedure.

Example 47 is the method of Example 46, further includes generating a power-off command for the PMU instructing the PMU to generate a power-off command for the power-managed compute system.

Example 48 is the method of Example 46, further includes updating a control and status register (CSR) to provide the PMU commands for managing a power state of the power-managed compute system.

Example 49 is the method of Example 46, further including updating the CSR to provide the PMU commands for managing a power state of the asynchronous event system.

Example 50 is the method of Example 46, where the active state includes one of a variety of power domains.

Example 51 is an apparatus including manner to perform a method as exemplified in any of Examples 26-50.

Example 52 is a manner for performing a method as Exampleed in any of Examples 26-50.

It will be obvious to those having skill in the art that many changes may be made to the details of the above-described embodiments without departing from the underlying principles of the embodiments described herein. The scope of the embodiments described herein should, therefore, be determined only by the following claims.

The invention claimed is:

1. An apparatus for managing power of a net-zero energy (NZE) internet of things (IoT) device, comprising:
  a power-managed compute system comprising memory and one or more processing units, the power-managed compute system configured to:
    enter an active state upon receiving a power-on command; and
    drive power management during the active state of the power-managed compute system;
  an asynchronous event system configured to generate one or more asynchronous events; and
  a power management unit configured to:
    receive the one or more asynchronous events from the asynchronous event system;
    perform charge monitoring adjusted for a transient effect caused by system load variation;
    based on the charge monitoring, determine if any of the one or more asynchronous events meet a respective charge qualification;
    if any of the one or more asynchronous events meet the respective charge qualification, generate the power-on command for the power-managed compute system; and
    if any of the one or more asynchronous events do not meet the respective charge qualification, wait for a power source to reach a threshold associated with the respective charge qualification.

2. The apparatus of claim 1, wherein the power management unit configured to determine if any of the one or more asynchronous events meet the respective charge qualification is further configured to determine whether the power source stores a charge sufficient to perform a plurality of operations associated with an asynchronous event from the one or more asynchronous events corresponding to the respective charge qualification.

3. The apparatus of claim 1, wherein the power management unit configured receive the one or more asynchronous events from the asynchronous event system are further configure to process the one or more asynchronous events from the asynchronous event system as wake sources.

4. The apparatus of claim 1, wherein the power management unit configured to receive the one or more asynchronous events from the asynchronous event system is further configured to process the one or more asynchronous events from the asynchronous event system as interrupt requests.

5. The apparatus of claim 4, wherein the interrupt requests are for the power-managed compute system.

6. The apparatus of claim 1, wherein the power management unit configured to determine if any of the one or more asynchronous events meet the respective charge qualification further comprises instructions to simultaneously determine whether the one or more asynchronous events meet the respective charge qualification.

7. The apparatus of claim 1, wherein the power management unit configured to determine if any of the one or more asynchronous events meet the respective charge qualification further comprises instructions to independently determine whether the one or more asynchronous events meet the respective charge qualification.

8. A power management unit (PMU), comprising:
memory configured to store a control and status register (CSR) wherein the CSR comprises at least a select register to qualify an asynchronous event;
a PMU finite state machine (FSM) configured to define a power state of a system on a chip (SoC);
power management integrated circuitry comprising a plurality of comparators configured to generate a charge indicator by comparing a battery charge to a plurality of thresholds, wherein the plurality of thresholds are biased based on the power state and wherein the battery charge is monitored to account for a transient effect caused by system load variation; and
control circuitry configured to:
if the asynchronous event is qualified as defined by the select register based on the charge indicator, alert a compute system of the asynchronous event; and
if the asynchronous event is not qualified as defined by the select register based on the charge indicator, wait for the battery charge to reach a battery charge threshold from the plurality of thresholds associated with the select register.

9. The PMU of claim 8, wherein the compute system comprises a power-managed compute system.

10. The PMU of claim 8, wherein the compute system comprises an asynchronous event system.

11. The PMU of claim 8, wherein the battery charge threshold is based on the power state.

12. The PMU of claim 8, wherein the control circuitry is further configured to apply a mask to determine whether to process the asynchronous event, wherein the mask is configured based on the power state.

13. The PMU of claim 8, wherein the charge indicator is one of N+3 possible charge indicators comprising:
N user defined charge indicators;
a full charge indicator;
a low charge indicator; and
an empty charge indicator.

14. The PMU of claim 8, wherein the CSR further comprises a map register to define a mapping of a plurality of power states to system load levels.

15. The PMU of claim 8, wherein the CSR further comprises a battery threshold set register to define the battery charge threshold.

16. The PMU of claim 8, wherein the CSR further comprises a status register to capture at least the charge indicator.

17. The PMU of claim 8, wherein the CSR further comprises a mask register to map asynchronous events to power states, wherein the asynchronous event is processed if the mask register maps the asynchronous event to the power state.

18. The PMU of claim 8, wherein the CSR further comprises a flag register to capture the asynchronous event.

19. The PMU of claim 8, wherein the CSR further comprises a command register to capture commands received from the compute system, wherein the commands configure the PMU.

20. The PMU of claim 8, wherein the CSR further comprises a configuration register to capture battery events that can be provided to the compute system.

* * * * *